United States Patent
Greenwald et al.

(10) Patent No.: US 6,386,965 B1
(45) Date of Patent: May 14, 2002

(54) VEHICLE INTERIOR AIRFLOW ASSEMBLY

(75) Inventors: Pamela Sue Greenwald, Sterling Heights; Marc Schins, South Lyon; Angie M. Fulmer, Byron, all of MI (US)

(73) Assignees: Delphi Technologies, Inc., Troy; General Motors Corporation, Detroit, both of MI (US)

( * ) Notice: Subject to any disclaimer, the term of this patent is extended or adjusted under 35 U.S.C. 154(b) by 0 days.

(21) Appl. No.: 09/745,007

(22) Filed: Dec. 20, 2000

(51) Int. Cl.⁷ .............................................. B61D 27/00

(52) U.S. Cl. ..................... 454/75; 454/152; 237/12.3 R; 165/41

(58) Field of Search .......................... 454/75, 152, 120, 454/907; 237/12.3 R, 46; 165/41, 42

(56) References Cited

U.S. PATENT DOCUMENTS

| | | | | | |
|---|---|---|---|---|---|
| 4,375,754 A | * | 3/1983 | Okura | ........................ | 165/43 |
| 4,498,309 A | * | 2/1985 | Kobayashi et al. | ........... | 165/43 |
| 5,330,385 A | * | 7/1994 | Hotta et al. | ..................... | 165/42 |
| 5,361,865 A | * | 11/1994 | Lindner | ........................ | 165/43 |
| 5,546,754 A | * | 8/1996 | Terao et al. | ................... | 62/133 |
| 5,562,538 A | * | 10/1996 | Suyama | ..................... | 165/267 |

* cited by examiner

*Primary Examiner*—Denise L. Esquivel
*Assistant Examiner*—Derek S. Boles
(74) *Attorney, Agent, or Firm*—Kathryn A. Marra

(57) ABSTRACT

An automatic airflow system for a vehicle interior is provided according to the present invention whereby air is automatically directed to the regions of the interior passenger compartment where occupants are seated. This is accomplished generally by including occupant sensing devices within the vehicle interior. When the sensing devices detects the presence of a body, a closing means such as a door behind appropriate air outlet members is opened thereby allowing air to flow through these outlet members and into the vehicle interior where one or more occupants are seated.

17 Claims, 4 Drawing Sheets

VEHICLE INTERIOR AIRFLOW ASSEMBLY

TECHNICAL FIELD

The present invention relates to vehicle interior airflow assemblies, and more particularly to an automatic vehicle interior airflow assembly.

BACKGROUND OF THE INVENTION

Conventional vehicle interiors include airflow systems for driver and passenger comfort. These airflow systems typically deliver air into the interior of a vehicle by means of air outlet members which are suitably positioned within the vehicle interior to provide a comfortable climate for the occupants of the vehicle. For example, air outlet members may be provided on the face of the dashboard or on the vehicle doors. The air outlet members are connected directly or indirectly to one or more air ducts which serve as the air-carrying members. The air outlets are generally configured to be manually controllable with, for example, control knobs, such as thumbwheels, which are designed to allow air to flow through the air outlet members and prevent air from flowing depending upon the precise setting of the air outlet member. The air outlet members also typically include directional vanes which serve to direct the airflow. Typically, one or more air outlet members are provided on the driver side and one or more air outlet members are provided on the passenger side of the vehicle interior so that the entire vehicle interior may be efficiently climate controlled for the comfort of the occupants. Additionally, many vehicle interiors include rear passenger seats. In this instance, many airflow systems include one or more air outlet members suitably positioned to deliver air to passengers in the rear seat.

Oftentimes, only a driver is in the vehicle and the driver desires additional airflow. Conventionally, this is accomplished by adjusting the thumbwheels for the air outlet members and/or adjusting the directional vanes. For example, the driver may close the air outlet members which are not designed to provide direct air flow to the driver and/or the driver may adjust the directional vanes to change the direction of the airflow. Both of these techniques require manual adjustment of the air outlets and this requires effort because some of the air outlet members are distally located from the driver's seating area. Thus, the driver will have to be in a stationary position to properly adjust these distally located air outlets. The manual adjustment of the air outlets likewise requires the driver to spend additional time to adjust the climate control system in an effort to provide a more comfortable driving environment.

SUMMARY OF THE INVENTION

The present invention describes a vehicle interior airflow assembly whereby air is automatically directed to the regions of the interior passenger compartment where occupants are seated. This is accomplished generally by including a sensing device on or within one or more seats in the vehicle interior. When the sensing device detects the presence of a body, a closing means such as a door coupled to one or more respective air outlet members is opened thereby allowing air to flow through these outlet members and into the vehicle interior where one or more occupants are seated.

In one exemplary embodiment, the assembly includes a vent assembly having a predetermined number of air outlet members for directing air into the vehicle interior. Typically, these air outlet members are fitted to a cross air duct which serves to receive the climate-controlled air and transfer the air throughout the vehicle interior. According to the present invention, each vehicle seat within the vehicle interior has a sensor associated therewith, wherein the sensor is configured for determining the presence of a body in the vehicle seat. The sensor communicates with the vent assembly so that upon detecting the presence of a body in the vehicle seat, the respective sensor sends a control signal for opening at least one of the air outlet members so that air flows through the at least one air outlet member and into the vehicle interior towards the occupied region(s) of the vehicle. In an exemplary embodiment, the sensors comprise mass sensors; however, it will be appreciated that any number of sensors may be used so long as the sensors are capable of detecting the presence of a body within the seating sections of the vehicle interior.

The vent assembly includes a number of actuators. Each actuator is operatively connected to one of the air outlet members so that upon receiving the control signal, the actuator causes a vent door to open and permit air to flow from the cross air duct and through the respective air outlet member and into the vehicle interior. The actuator may be mechanically linked to a component of the air outlet member and more specifically, the actuator is operatively linked to a control knob, e.g., a thumbwheel of the air outlet member, which is designed to cause the opening and closing of the door upon manual manipulation of the thumbwheel. In this case, activation of the actuator causes movement of the thumbwheel which in turn adjusts the position of the door relative to the remaining portions of the air outlet member to permit or prevent air flow through the air outlet member.

Advantageously, the airflow system of the present invention is designed to provide climate and comfort control to only the regions of the passenger compartment where one or more occupants are seated. This leads to more efficient air flow venting within the passenger compartment causing better climate control because the air flow to the occupied sections is not unnecessarily reduced because some of the air if being directed into unoccupied sections.

BRIEF DESCRIPTION OF THE DRAWINGS

The present invention will now be described, by way of example, with reference to the accompanying drawings, in which.

DETAILED DESCRIPTION OF THE INVENTION

Figure 1:
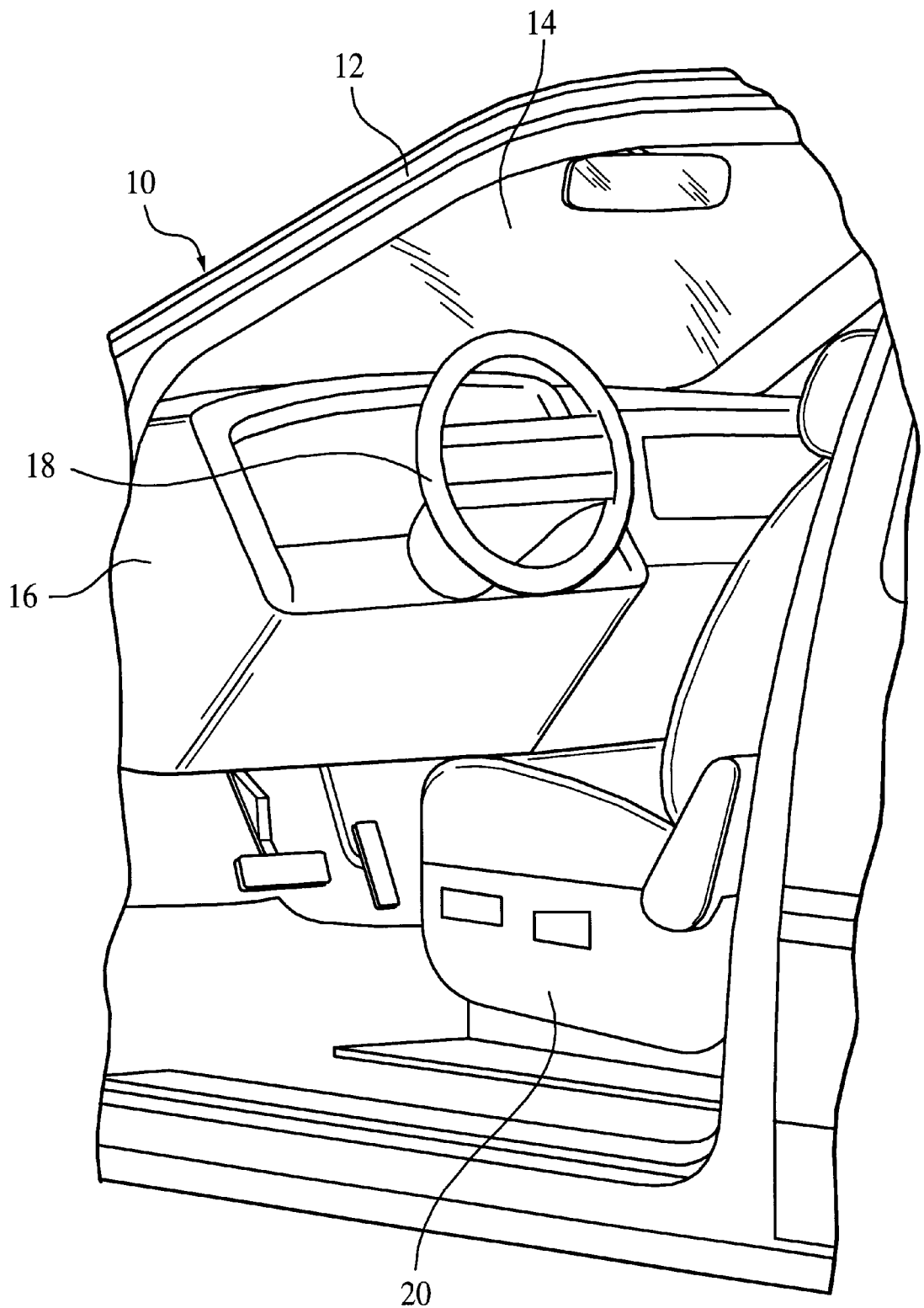
FIG. 1 is a partial perspective view of a vehicle.

Referring to FIG. 1 in which a vehicle is partially shown and generally indicated at 10. The vehicle 10 includes a vehicle body 12 which defines an interior passenger compartment 14. An instrument panel 16 extends across the vehicle body 12 and a steering wheel 18 extends away from the instrument panel 16. The vehicle 10 also includes seats for the occupants and for purpose of illustration only a driver seat 20 is partially shown in FIG. 1.

Figure 2:
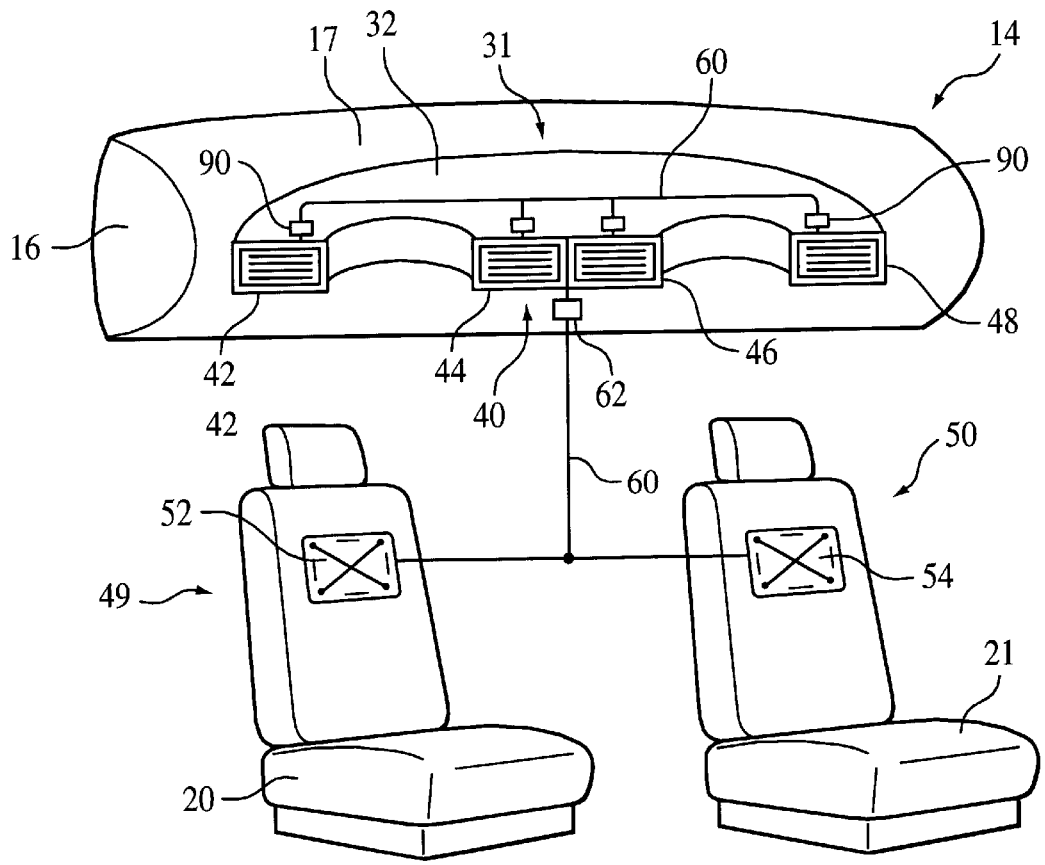
FIG. 2 is a schematic of an automotive interior including an automatic airflow system embodied by the present invention.

Now turning to FIGS. 1–2. FIG. 2 is a schematic of an exemplary embodiment of an automatic airflow system 30 for use in the passenger compartment 14 of vehicle 10. The automatic airflow system 30 of the present invention generally includes a means for receiving and delivering air throughout the passenger compartment 14 and typically, a cross air duct 32 extends across the passenger compartment 14 and is designed to distribute air. The air duct 32 is thus coupled to a device which supplies the air to the cross air duct 32. This device is often in the form of a heating, ventilation, or air conditioning system which generates and/or transfers air into the air duct 32. The cross air duct 32 has a number of air outlet members, generally indicated at 40, formed therein for delivering the air at various locations. As used herein, the term "vent assembly" refers to a vent assembly including the cross air duct 32 and a predetermined number of air outlet members 40 and is generally indicated at 39. Because the cross air duct 32 is usually positioned within the instrument panel 16 and longitudinally extends thereacross, the instrument panel 16 has a number of openings (not shown) formed therein on a first surface 17 of the instrument panel 16 which faces the occupants of the vehicle 10. The number of openings formed in the instrument panel 16 will also preferably correspond to the number of air outlet members 40 so that each air outlet 40 opens into the passenger compartment 14 for climate control thereof.

In the exemplary embodiment shown in FIG. 2, the cross air duct 32 has four separate air outlets, namely a first air outlet member 42, a second air outlet member 44, a third air outlet member 46, and a fourth air outlet member 46. Typically, the vehicle 10 is designed so that the climate control of the passenger compartment 14 is broken down into a number of regions and more specifically, the vehicle 10 broadly includes a driver region 49 and a passenger region 50. As shown in FIG. 2, the first and second air outlet members 42, 44, respectively, are positioned so as to provide air flow to the driver region (or zone) 49 and the third and fourth air outlet members 46, 48, respectively, are positioned so as to provide air flow to the passenger region (or zone) 50. The air outlet members 42, 44, 46, 48 may have any number of suitable air outlet designs. For example, the air outlet members 42, 44, 46, 48 may be barrel type air outlets, dual vane type air outlets, or any other mechanical variant of an air outlet. Barrel type air outlets typically have a series of vanes thereon to direct the airflow in a first direction (e.g., up or down). Certain barrel type air outlets also are pivotally connected such that the airflow can be directed in a second direction (e.g., left or right). Dual vane type air outlets typically have a horizontal series of vanes to direct the airflow in the first direction, and a vertical series of vanes to direct the airflow in the second direction. Other mechanical air outlets typically comprise a housing and a grille cover and are controllable with a joystick device that generally changes the direction of a cylinder entering the housing. One thing that is common to most air outlet designs is that a means for controlling whether air is permitted or prevented from flowing therethrough is provided. As will be described in more detail hereinafter, this means is generally in the form of a door provided between one of the air outlet members 42, 44, 46, 48 at the juncture of the cross air duct 32 or other ducting system that is used.

As shown in FIG. 2, the passenger compartment 14 includes the driver seat 20 and a passenger seat 21 disposed adjacent to the driver seat 20. According to the present invention, the driver seat 20 has a first sensor 52 and the passenger seat 21 has a second sensor 54. The first and second sensors 52, 54 are designed to sense whether an occupant is seated within the respective driver or passenger seat 20, 21. In one embodiment, the first and second sensors 52, 54 comprise mass sensors and in another embodiment, the first and second sensors 52, 54 are mass sensors having a threshold mass determination of 40 lbs. (18.14 kg). However, it is within the scope of the present invention that any suitable sensor capable of detecting the presence of an occupant can be employed in the airflow system 30. For example, other suitable sensors include but are not limited to pressure sensors, heat sensors which determine body heat, and proximity sensors. Each of the first and second sensors 52, 54 is electrically connected to a signal-carrying member, such as a wire or cable, which is generally indicated at 60. The signal-carrying member 60 has an override switch 62 which is preferably provided within the passenger compartment 14 so that one of the occupants may access and manipulate the override switch 62, as will be described in greater detail hereinafter.

Figure 3:
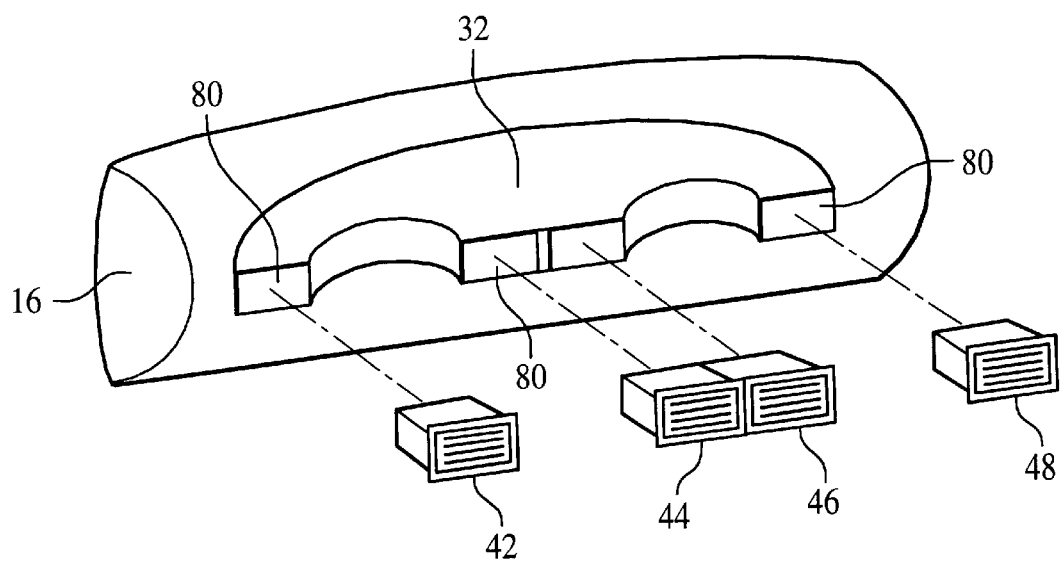
FIG. 3 is a partially exploded view of an automotive instrument panel shown in FIG. 2.

Referring now to FIG. 3 in which instrument panel 16 is illustrated showing the air duct 32 and the air outlet members 42, 44, 46, 48 removed from the instrument panel 16. During operation, the air duct 32 has an air flow of $V_T$ which represents the total air flow in terms of volume per measurement of time. The air flow, $V_T$, is controllable by one or more controls (not shown) on the instrument panel 16 which are designed to permit the user to vary the flow rate of air through the air duct 32. Of course and as is the case in many vehicles today, the passenger compartment 14 may be controlled by an automatic control system which automatically makes the necessary adjustments so that the passenger compartment 14 is maintained at a desired temperature. In the exemplary embodiment shown in FIG. 3, the air flow $V_T$ is the sum of the air flow through each of the air outlet members 42, 44, 46, 48. In other words, the first air outlet member 42 has a first air flow value $V_1$ which represents the rate of air flow through the first air outlet member 42; the second air outlet member 44 has a second air flow value $V_2$; the third air outlet member 44 has a third air flow value $V_3$; and the fourth air outlet member 46 has a fourth air flow value $V_4$. Each of these values $V_1$, $V_2$, $V_3$, $V_4$ thus represents the volume of air exiting the respective air outlet members 42, 44, 46, 30 48, respectively. When all of the air outlet members 42, 44, 46, 48 are open, the air duct 32 is designed so that ideally each of $V_1$, $V_2$, $V_3$, $V_4$ represents 25% of the total air flow $V_T$. Thus, the passenger compartment 14 and air duct 32 are configured so that the driver region 49 has approximately 50% of the total air flow, $V_T$, and the passenger region 50 has approximately 50% of the total air flow $V_T$.

Figure 4:
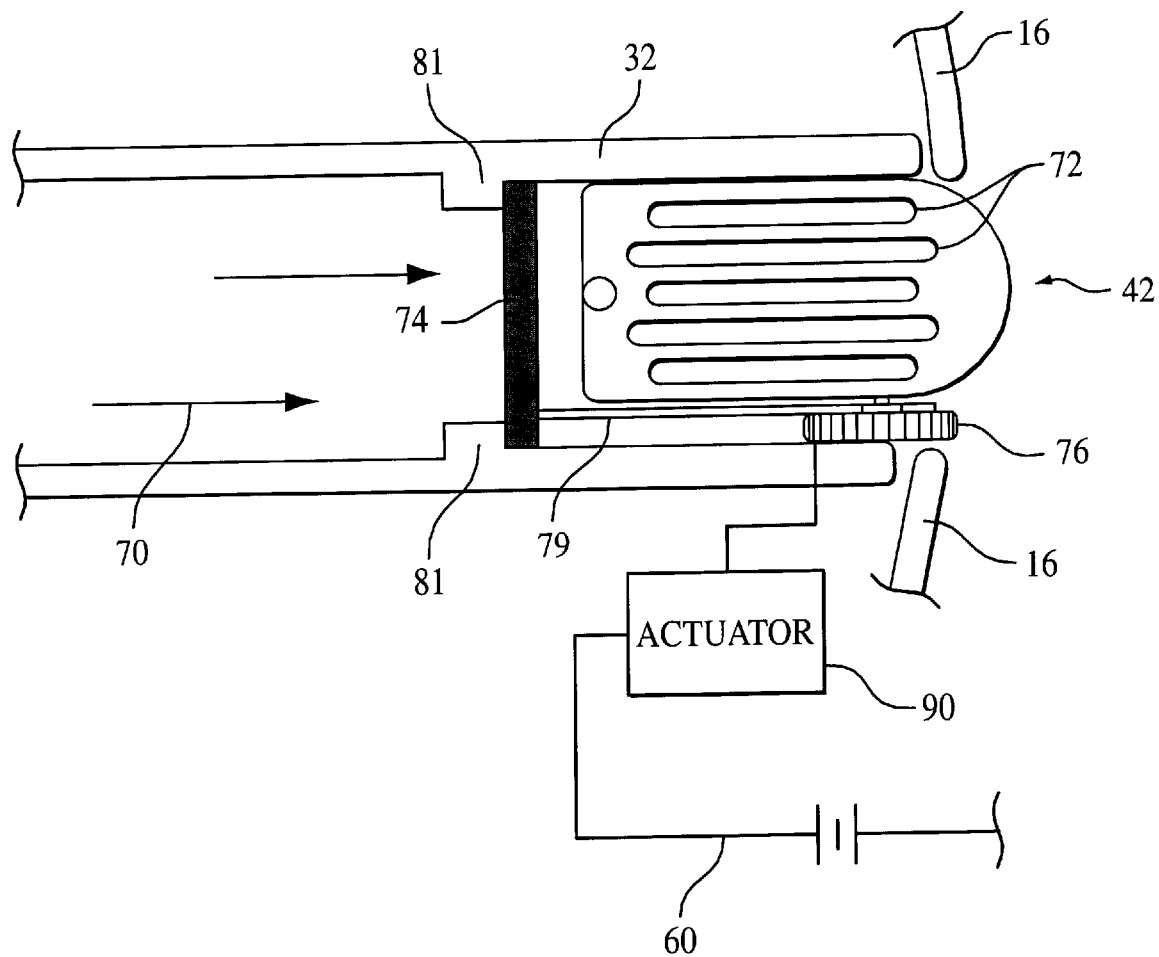
FIG. 4 is a cross-sectional view of a cross air duct and an air outlet member according to one exemption embodiment.

Referring to FIGS. 1–4. FIG. 4 is a cross-sectional view of air outlet member 42 showing its relation to cross air duct 32. It will be appreciated that air outlet members 44, 46, 48 are all preferably similar to air outlet member 42 and accordingly the following description of air outlet member 42 equally applies to air outlet members 44, 46, 48. Air flow within the air duct 32 is shown by indicational arrows 70 which more specifically show the direction which air flows from the air duct 32 to the air outlet member 42. In the exemplary embodiment shown, the air outlet member 42 includes a plurality of vanes 72 for manually directing the air flow and the air outlet member 42 includes a door 74 for preventing air from, flowing from the air duct 32 into the air outlet member 42. Thus door 74 serves to close the air outlet member 42. In conventional systems, the door 74 is controllable by a thumbwheel 76 which the occupant manipulates for causing either the opening or closing of the air outlet member 42. It will be understood that when the thumbwheel 76 is adjusted to a position between an open and closed position, the air outlet member 42 will be partially open and the air flow is restricted. The air outlet member 42 is sized and shaped to be received within an air outlet cavity 80 which is formed in the air duct 32. It will be appreciated that air duct 32 has one air outlet cavity 80 formed therein for each of air outlet members 42, 44, 46, 48. Preferably, a flange 81 is provided to provide a seal between the air duct 32 and each of air outlet members 42, 44, 46, 48 when the door 74 is in the closed position. The flange 81 also serves to locate the respective air outlet member within the cross air duct 32. In the illustrated embodiment, the door 74 seats against the flange 81.

According to the present invention, an actuator 90 is operatively connected to the door 74 so that activation of the actuator 90 causes either the opening or closing of the door 74 depending upon the application. The actuator 90 is designed to control the movement of the door 74 and therefore may be linked to the door 74 by any number of mechanisms including a variety of mechanical mechanisms. For example, the actuator 90 may be linked to the thumbwheel 76 so that activation of the actuator 90 causes movement of the thumbwheel 76 which correspondingly adjusts the position of the door 74. The actuator 90 is also connected to the signal-carrying member 60 and preferably this connection is electrical in nature.

In conventional vehicle interiors, the opening and closing of the door 74 are controlled only by manual manipulation of the thumbwheel 76. For example, a mechanical mechanism 79 may be provided for mechanically linking the thumbwheel 76 to the door 74. According to the present invention, the door 74 is opened and closed by the operation of the actuator 90 and the first sensor 52. More specifically, upon the first sensor 52 determining that a body is present in the driver seat 20, the first sensor 52 sends a first control signal along the signal carrying member 60 to the actuator 90 which in response causes the door 74 to move to the open position thereby permitting air to flow from the air duct 32 and into the air outlet member 42. In the preferred embodiment, the default position of door 74 of each of air outlet members 42, 44, 46, 48 comprises a closed position so that air flow is prevented from flowing the respective air outlet members 42, 44, 46, 48. If a body is present only in the driver seat 20, only air outlet members 42, 44 will be caused to be opened because the first sensor 52 will instruct the actuator 90 to open the air outlet members which correspond to the driver region 49, namely air outlet members 42, 44. The air outlet members 46, 48, which correspond to the passenger region 50 remain closed because the second sensor 54 has failed to detect a body present in the passenger seat 21. Under this scenario, $V_1$ and $V_2$ are equal to 50% of $V_T$ and $V_3$ and $V_4$ each have a value of 0 because no air is flowing therethrough. Advantageously, the airflow system 30 is designed to provide climate and comfort control to only the regions of the interior compartment 16 where one or more occupants are seated. This leads to more efficient air flow venting within the passenger compartment 16 causing better climate control.

The driver may close the doors 74 of at least one of the air outlet members 42, 44 by manual manipulation of thumbwheel 76. Alternatively, the driver may deactivate the automatic airflow system 30 by pressing the override switch 62 which is connected to the signal-carrying member 60 and is configured to signal the actuators 90 which are operatively connected to the doors 74 of the air outlet members 42, 44. Upon receiving an override signal from the override switch 62, the doors 74 are moved to their closed positions and air is prevented from flowing through the air outlet members 42, 44.

If a body is detected in the passenger seat 21 by the second sensor 54, then a second control signal is sent from the second sensor 54 to the actuators 90 corresponding to the air outlet members 46, 48 disposed in the passenger region 50. Upon receiving the second control signal, the actuators 90 cause the door 74 of each of the air outlet members 46, 48 to open thereby permitting air to flow through the air outlet members 46, 48 and into the passenger region 50. Under this scenario, $V_1$ and $V_2$ are equal to 25% of $V_T$ and $V_3$ and $V_4$ each also have a value of 25% because air is flowing through each of the air outlet members 42, 44, 46, 48.

Figure 5:
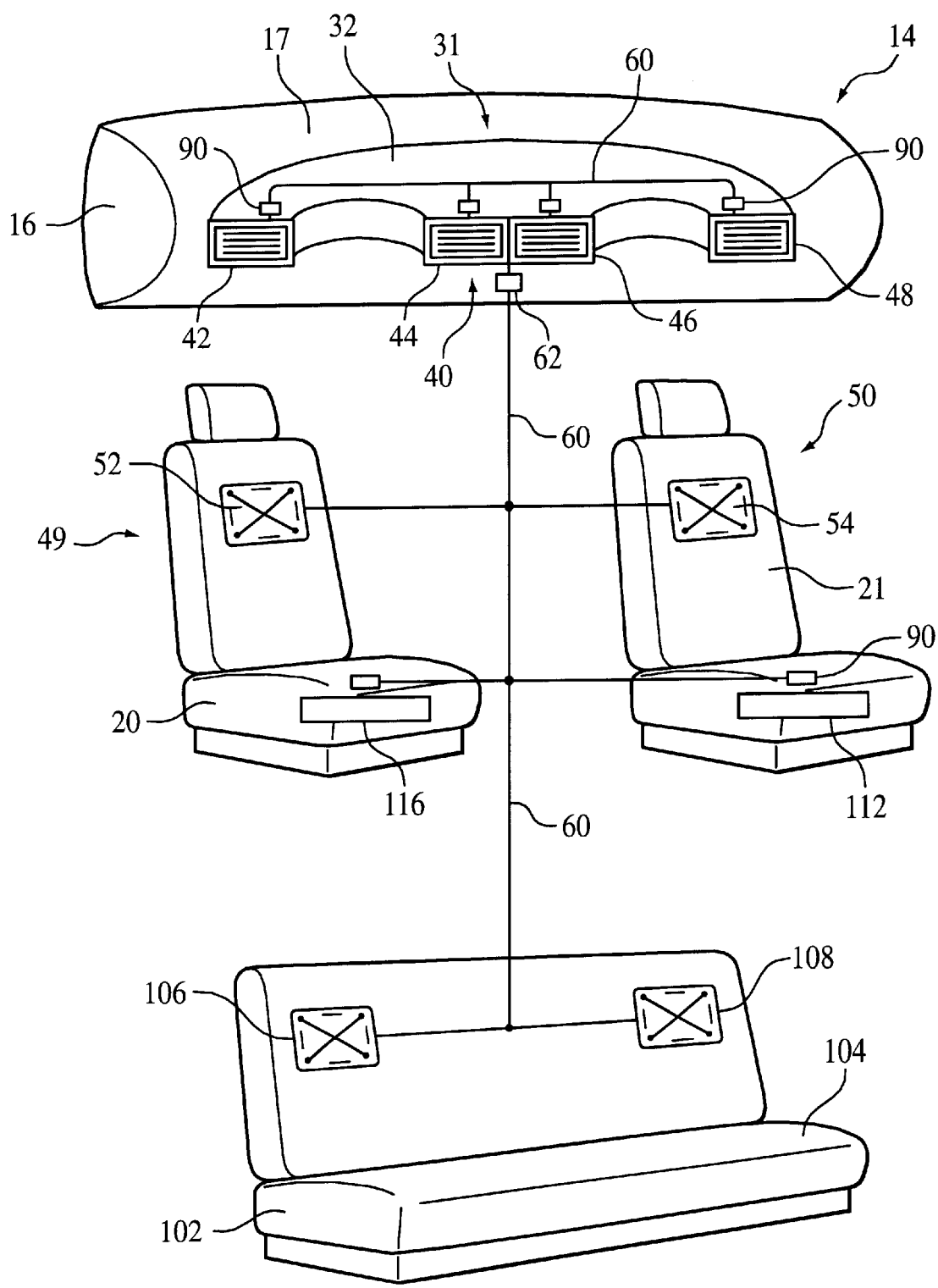
FIG. 5 a schematic of an automotive interior including an alternative embodiment of an automatic airflow system of the present invention.

Referring now to FIG. 5 which illustrates another embodiment of the present invention. In this embodiment, a third region namely a rear seating region 100 is provided and is linked to the automatic airflow system 30 of the present invention. The rear seating region 100 includes rear seating sections 102, 104, wherein the rear seating section 102 has a third sensor 106 and the rear seating section 104 has a fourth sensor 108. Typically, air is directed rearward from the air duct 32 to the rear seating region 100 by means of a pair of air duct carriers 110, 112. The air duct carriers 110, 112 may comprise any number of members and in one embodiment, the air duct carriers 110, 112 comprise air duct tubes which are designed to carry climate controlled air to the rear seating region 100. The illustrated air duct carriers 110, 112 are positioned underneath the driver and passenger seats 20, 21, respectively. Each of the air duct carriers 110, 112 has a door (not shown) which is similar to door 74 in that it permits or prevents air from exiting ends of the air duct carriers 110, 112 into the rear seating region 100. The doors for the air duct carriers 110, 112 are each operatively connected to an actuator (not shown) which is similar to actuator 90 and serves to cause the door to open or close relative to one of the air duct carriers 110, 112.

When the third sensor 106 detects a body seated in the rear seating section 102, a third control signal is generated and sent to the actuator which causes the door to open thereby opening the air duct carrier 110. Similarly, when the fourth sensor 108 detects a body seated in the rear seating section 104, a fourth control signal is generated and sent to the actuator which causes the door to open thereby opening the air duct carrier 112. Thus, the rear seating region 100 is automatically controlled so that air flows to occupied regions thereof. If no passengers are present in the rear seating region 100, then the air duct carriers 110, 112 preferably remain closed and air flow is maximized in the forward portion of the vehicle instead 10 (FIG. 1) of transferring air to unoccupied areas. It will be appreciated that additional sensors may be provided in the rear seating section 100 for detecting a body anywhere within the rear seating section 100.

Referring now to FIGS. 1–5. The default settings for the air outlet members 42, 44, 46, 48 can be preset (e.g., at the factory) or can be user controlled. For example, the automatic airflow system 30 of the present invention may be configured so that air outlet members 42, 44 are always open (i.e., associated doors 72 are open in the default position). In such a system, the first sensor 52 on the driver seat 20 can be eliminated. Furthermore, the settings of each of the sensors 52, 54, 106, 108 can be preset or user controlled. As mentioned above, in one embodiment the sensors 52, 54, 106, 108 are mass sensors that activate the corresponding actuators when a mass of at least 40 lbs. (18.14 kg) is sensed.

However, in another embodiment, the user, for example, can vary this mass threshold with a control apparatus such as an in-dash computer system (not shown). It is also understood that the type of air outlet members 42, 44, 46, 48 or air duct 32 is not critical to the operation of automatic airflow system 30. Furthermore, floor duct tubes or overhead duct tubes can carry the airflow that is controllable with automatic airflow system 30. The air duct 32, while described herein as a common air duct may actually comprise separate air ducts. Furthermore, the location and type of actuator 90 employed can vary, generally depending on the type of air outlet member employed.

Additionally, the location and type of the door 74 can vary. For example, where a common air duct, such as air duct 32, is employed, a single radial swing door 74 can be configured and positioned such that, by default, air is directed to the driver side 48, and when a body is detected in the passenger seat 21, this door 74 opens allowing air to flow to all of air outlet members 42, 44, 46, 48.

One advantage of the present invention is the provision of a higher air volume and velocity to regions of the vehicle interior 14 having bodies seated therein. Another alternative embodiment provides an isolation advantage such that when no bodies are detected in the vehicle 10 (e.g., when the automobile is parked), the air outlet members 42, 44, 46, 48 can be isolated from a vehicle air vent (not shown) preventing the introduction of outside air or the escape of interior air. This embodiment generally includes a power feed (not shown) that remains activated after the vehicle 10 is shut down, which can be a temporary power feed (e.g., long enough for the sensors to detect the lack of bodies and signal the actuator to close the doors).

While the invention has been described with reference to a preferred embodiment and various alternative embodiments, it will be understood by those skilled in the art that various changes may be made and equivalents may be substituted for elements thereof without departing from the scope of the invention.

What is claimed:

1. An automatically adjustable airflow system for use in a vehicle interior, the system comprising:
   a vent assembly having a predetermined number of air outlet members for directing air into the vehicle interior; and
   a first sensor disposed in a vehicle seat, the first sensor being configured for determining the presence of a body in the vehicle seat, the first sensor communicating with the vent assembly so that upon detecting the presence of a body in the vehicle seat, the first sensor sends a first control signal for opening at least one of the air outlet members so that air flows through the at least one air outlet member and into the vehicle interior.

2. The system of claim 1, wherein the first sensor is selected from the group consisting of a mass sensor, a heat sensor, a pressure sensor, and a proximity sensor.

3. The system of claim 1, wherein in a default position, the air outlet members are closed and air is prevented from flowing therethrough and into the vehicle interior.

4. The system of claim 1, wherein the vent assembly includes a cross air duct, the air outlet members being formed as part of the air duct at predetermined locations along the cross air duct for transferring air from the cross air duct and into the vehicle interior.

5. The system of claim 1, wherein each of the air outlet members includes a vent door which in an open position permits air to exit the air outlet member and flow into the vehicle interior, the vent door being opened in response to the first control signal being generated.

6. The system of claim 1, wherein the vent assembly includes a plurality of actuators, one actuator being operatively coupled to one of the air outlet members so that upon receiving the first control signal, the one actuator causes air to flow through at least one of the air outlet members.

7. The system of claim 1, wherein the seat comprises a driver seat.

8. The system of claim 1, further including:
   a second sensor disposed in a second seat, the second sensor communicating with the vent assembly so that upon sensing the presence of a body in the second seat, the second sensor sends a second control signal for opening one or more of the air outlet members.

9. The system of claim 1, further including:
   a switch for deactivating the first sensor so that an occupant may manually adjust the flow of air and prevent air from flowing into one or more of the air outlet members.

10. The system of claim 1, wherein the first sensor sends a default signal when the first sensor no longer detects a body within the seat, the default signal causing the vent assembly to close one or more of the air outlet members.

11. An automatically adjustable airflow system for use in a vehicle interior divided into a forward passenger region and a rear passenger region, the system comprising:
    a vent assembly having a predetermined number of first air outlet members for directing air into the forward passenger region and second air outlet members for directing air into the rear passenger region;
    first sensors disposed in the forward passenger region and second sensors disposed in the rear passenger region, the first sensors being configured for determining the presence of a body in the forward passenger region, the second sensors being configured for determining the presence of a body in the rear passenger region, the first sensors communicating with the vent assembly so that upon detecting the presence of a body in the forward passenger region, at least one of the first sensors sends a first control signal for opening at least one of the first air outlet members so that air flows through the at least one first air outlet member and into the forward passenger region, the second sensors communicating with the vent assembly so that upon detecting the presence of a body in the rear passenger region, at least one of the second sensors sends a second control signal for opening at least one of the second air outlet members so that air flows through the at least one second air outlet member and into the rear passenger region.

12. The system of claim 11, wherein the first and second sensors are selected from the group consisting of mass sensors, heat sensors, pressure sensors, and proximity sensors.

13. The system of claim 11, wherein in a default position, the first and second air outlet members are closed and air is prevented from flowing therethrough and into the vehicle interior.

14. The system of claim 11, wherein the vent assembly includes a cross air duct, the first air outlet members being formed as part of the cross air duct at predetermined locations along the cross air duct for transferring air from the cross air duct and into the forward passenger region and the second air outlet members are part of air ducts which fluidly communicate with the cross air duct and transfer air to the rear passenger region.

15. The system of claim 11, wherein each of the first and second air outlet members includes a vent door which in an open position permits air to exit the first and second air outlet members and flow into the vehicle interior, the vent door being opened in response to one of the first and second control signals being generated.

16. The system of claim 11, wherein the vent assembly includes a plurality of actuators, one actuator being operatively coupled to one of the first and second air outlet members so that upon receiving one of the first and second control signals, the one actuator causes air to flow through at least one of the first and second air outlet members.

17. The system of claim 16, wherein each actuator is mechanically connected to a thumbwheel of one of the first and second air outlet members, the thumbwheel serving to open and close a vent door which permits air to flow the respective first or second air outlet member and into the vehicle interior.

* * * * *